US008418772B2

(12) United States Patent
Millet et al.

(10) Patent No.: US 8,418,772 B2
(45) Date of Patent: Apr. 16, 2013

(54) MANDREL TO BE INSERTED INTO A LIQUID CIRCULATION PIPE AND ASSOCIATED POSITIONING METHOD

(75) Inventors: François Millet, Antony (FR);
Pierre-Arnaud Foucher, Poissy (FR);
Paul Helderle, Paris (FR)

(73) Assignee: Geoservices Equipements, Roissy-en-France (FR)

( * ) Notice: Subject to any disclaimer, the term of this patent is extended or adjusted under 35 U.S.C. 154(b) by 598 days.

(21) Appl. No.: 12/449,299

(22) PCT Filed: Feb. 4, 2008

(86) PCT No.: PCT/FR2008/050175
§ 371 (c)(1),
(2), (4) Date: Jan. 6, 2010

(87) PCT Pub. No.: WO2008/104675
PCT Pub. Date: Apr. 9, 2008

(65) Prior Publication Data
US 2010/0101806 A1 Apr. 29, 2010

(30) Foreign Application Priority Data
Feb. 5, 2007 (FR) ...................................... 07 53057

(51) Int. Cl.
E21B 33/129 (2006.01)
(52) U.S. Cl.
USPC .......................................... 166/387; 166/136
(58) Field of Classification Search .................. 166/237, 166/238, 239, 378, 381, 387, 118, 119, 136, 166/138, 203, 137, 214
See application file for complete search history.

(56) References Cited

U.S. PATENT DOCUMENTS

| 1,536,370 | A | * | 5/1925 | Becker | 166/137 |
| 1,604,771 | A | * | 10/1926 | Gill | 166/124 |
| 2,178,161 | A | * | 10/1939 | Blair | 166/311 |
| 2,230,721 | A | | 4/1940 | Bendeler et al. | |

(Continued)

FOREIGN PATENT DOCUMENTS
GB 2 337 064 11/1999
WO 2005/106189 11/2005

OTHER PUBLICATIONS

International Search Report issued Aug. 13, 2008 in International (PCT) Application No. PCT/FR2008/050175, filed Feb. 4, 2008.

Primary Examiner — Jennifer H Gay
Assistant Examiner — Blake Michener
(74) Attorney, Agent, or Firm — Wenderoth, Lind & Ponack, L.L.P.

(57) ABSTRACT

This mandrel (10) comprises a body (16; 22) and a radially expandable annular sealing element (18) which comprises a centring arrangement (46) and a closure arrangement (44) which can be deployed radially between a contracted configuration and a dilated configuration. It further comprises an anchoring element (20) which is positioned at a longitudinal distance from the sealing element (18) and is radially expandable between a retracted state and a deployed state. The mandrel (10) comprises sequencing means (24) which are capable of radially deploying the closure arrangement (44) after the anchoring element (20) and the centring arrangement (46).
In an at least partly deployed configuration, the centring arrangement (46) defines at least one axial passage (64) which extends through the annular sealing element (18). The closure arrangement (44) closes the or each axial passage (64) as it is deployed.

13 Claims, 9 Drawing Sheets

U.S. PATENT DOCUMENTS

| | | | | |
|---|---|---|---|---|
| 2,262,117 | A * | 11/1941 | Roe | 166/123 |
| 2,376,605 | A * | 5/1945 | Lawrence | 166/125 |
| 2,715,441 | A * | 8/1955 | Bouvier | 166/127 |
| 2,845,126 | A * | 7/1958 | Brown | 166/119 |
| 3,000,443 | A * | 9/1961 | Thompson | 166/135 |
| 3,467,186 | A * | 9/1969 | Current | 166/216 |
| 3,572,433 | A * | 3/1971 | Conrad | 166/132 |
| RE31,978 | E * | 9/1985 | McStravick | 166/387 |
| 4,590,995 | A * | 5/1986 | Evans | 166/127 |
| 4,862,961 | A * | 9/1989 | Neff | 166/127 |
| 4,949,793 | A * | 8/1990 | Rubbo et al. | 166/382 |
| 5,501,281 | A * | 3/1996 | White et al. | 166/387 |
| 6,123,148 | A * | 9/2000 | Oneal | 166/118 |
| 6,131,663 | A * | 10/2000 | Henley et al. | 166/373 |
| 6,167,963 | B1 | 1/2001 | McMahan et al. | |
| 6,234,249 | B1 * | 5/2001 | Andersen et al. | 166/118 |
| 6,695,051 | B2 | 2/2004 | Smith et al. | |
| 6,892,820 | B2 * | 5/2005 | Divis et al. | 166/387 |
| 7,114,559 | B2 * | 10/2006 | Sonnier et al. | 166/206 |
| 7,178,602 | B2 * | 2/2007 | Hiorth et al. | 166/382 |
| 7,290,603 | B2 * | 11/2007 | Hiorth et al. | 166/136 |
| 7,422,071 | B2 * | 9/2008 | Wilkie et al. | 166/387 |
| 7,669,665 | B2 * | 3/2010 | Millet et al. | 166/382 |
| 7,806,192 | B2 * | 10/2010 | Foster et al. | 166/387 |
| 2003/0226659 | A1 | 12/2003 | Smith et al. | |
| 2003/0226668 | A1 * | 12/2003 | Zimmerman et al. | 166/387 |
| 2004/0026092 | A1 * | 2/2004 | Divis et al. | 166/387 |
| 2004/0055755 | A1 * | 3/2004 | Roesner et al. | 166/382 |
| 2004/0134659 | A1 * | 7/2004 | Hoffman et al. | 166/305.1 |
| 2005/0023004 | A1 * | 2/2005 | King et al. | 166/387 |
| 2006/0032628 | A1 * | 2/2006 | McGarian et al. | 166/191 |
| 2007/0221372 | A1 | 9/2007 | Telfer | |

* cited by examiner

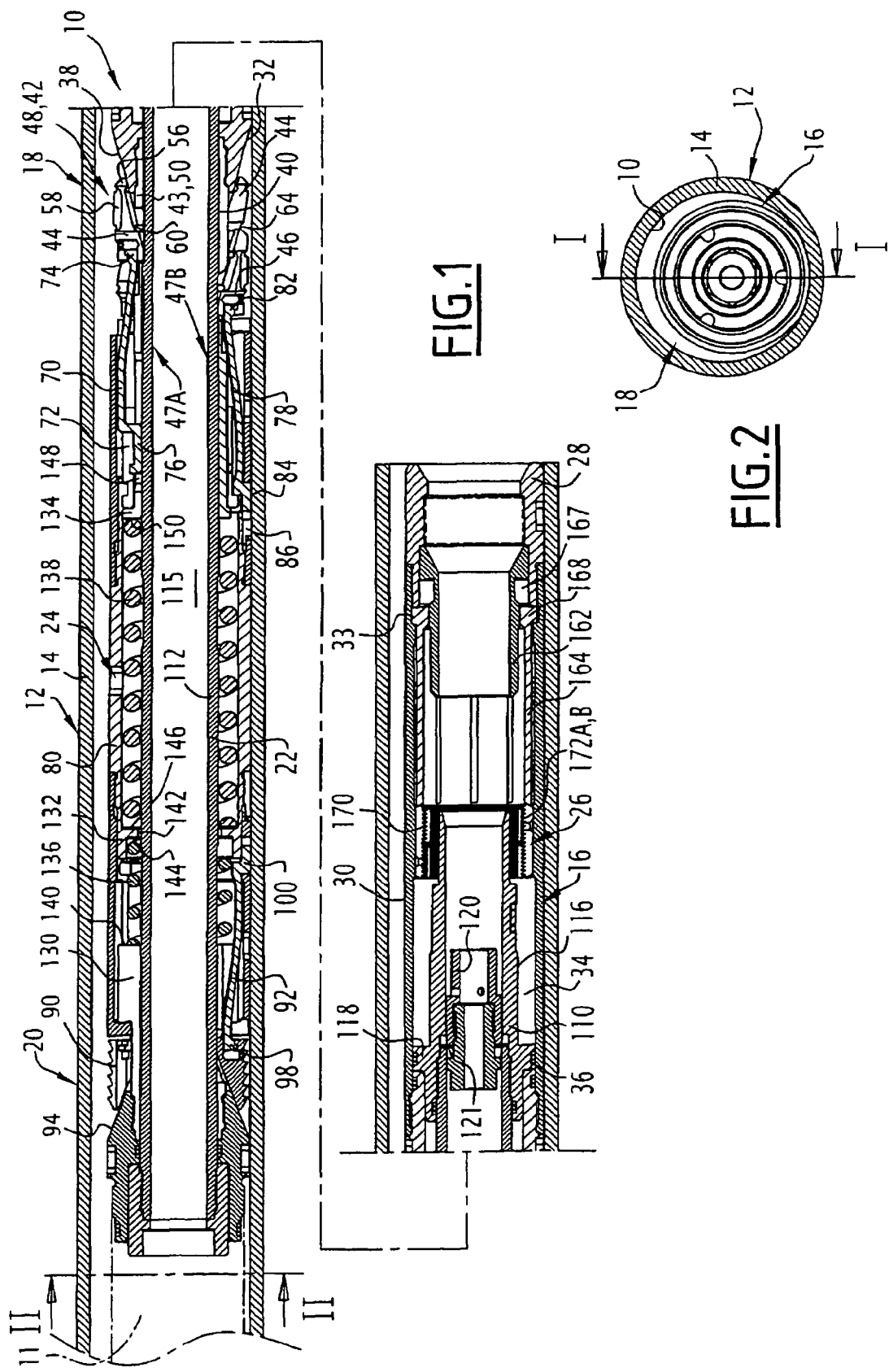

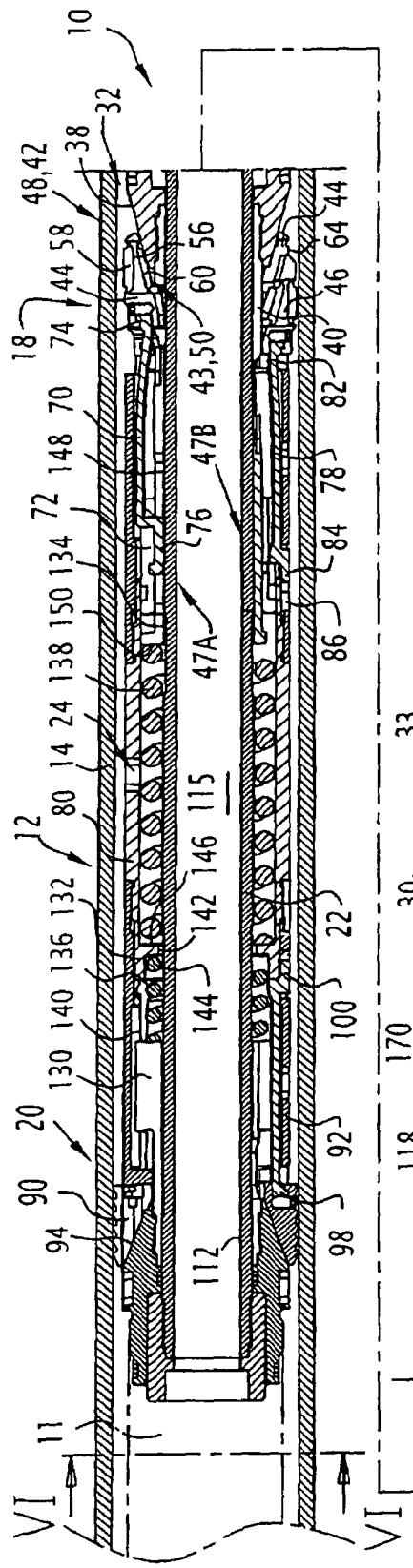
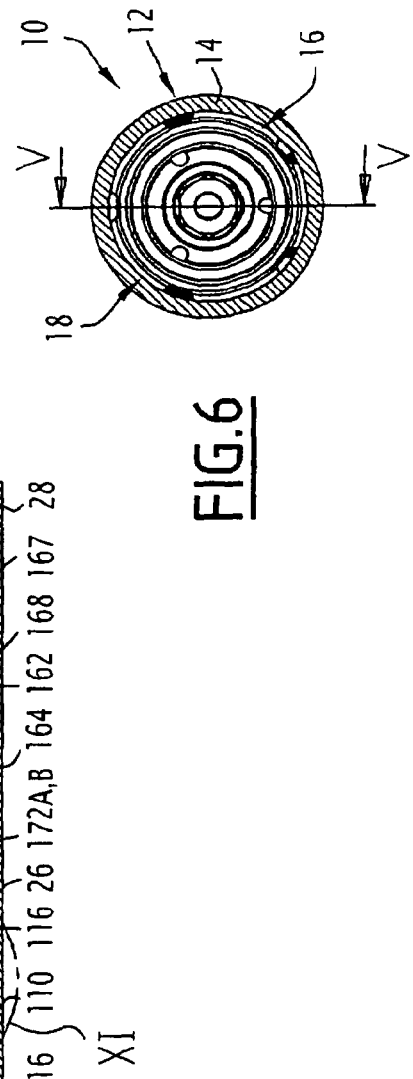
FIG.5
FIG.6

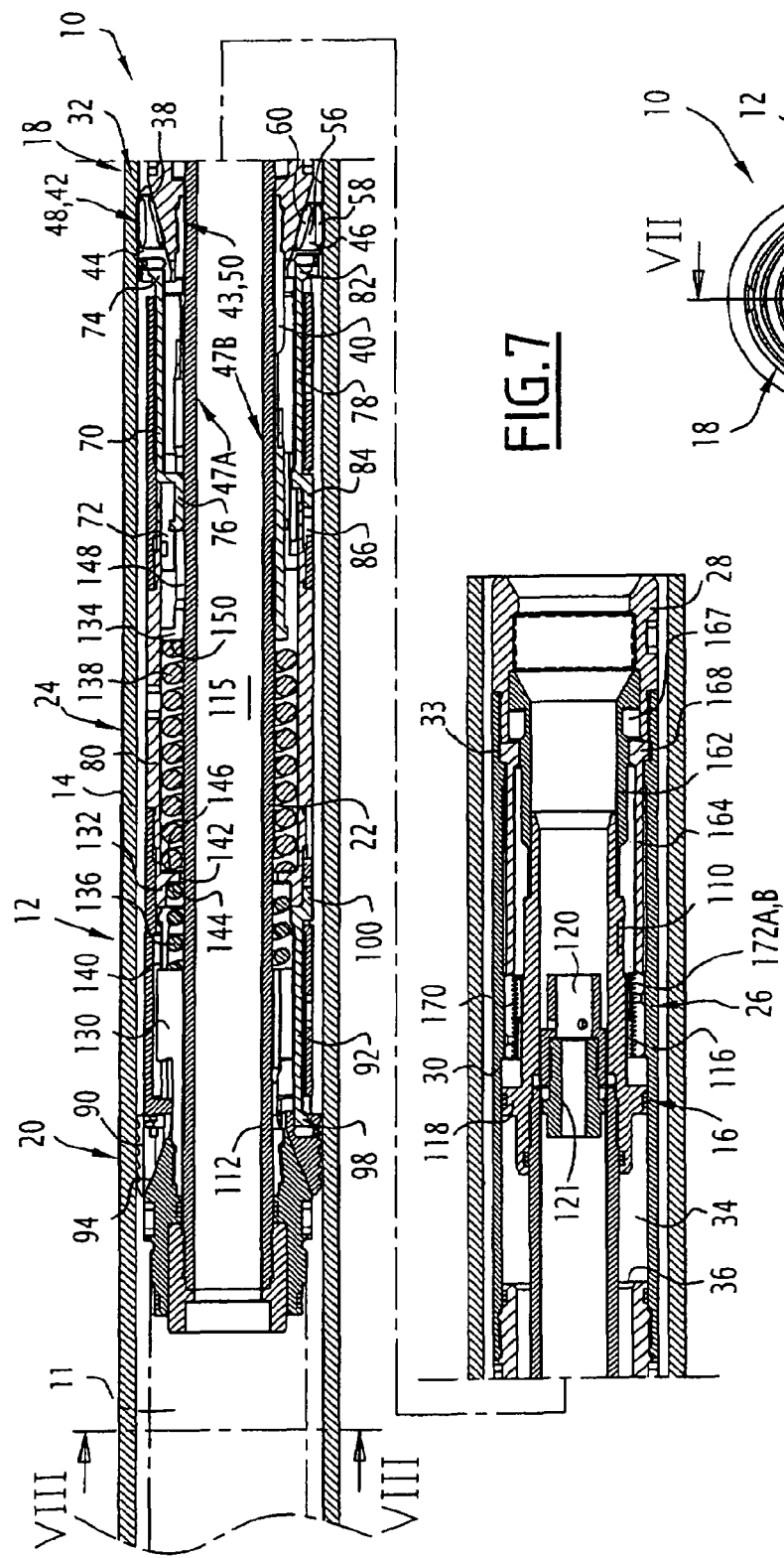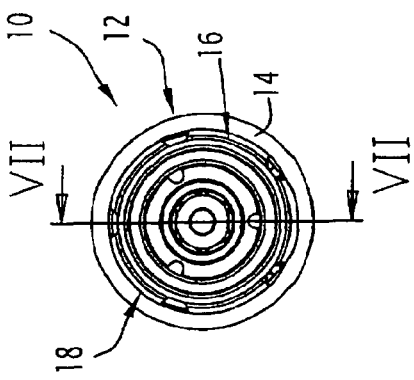

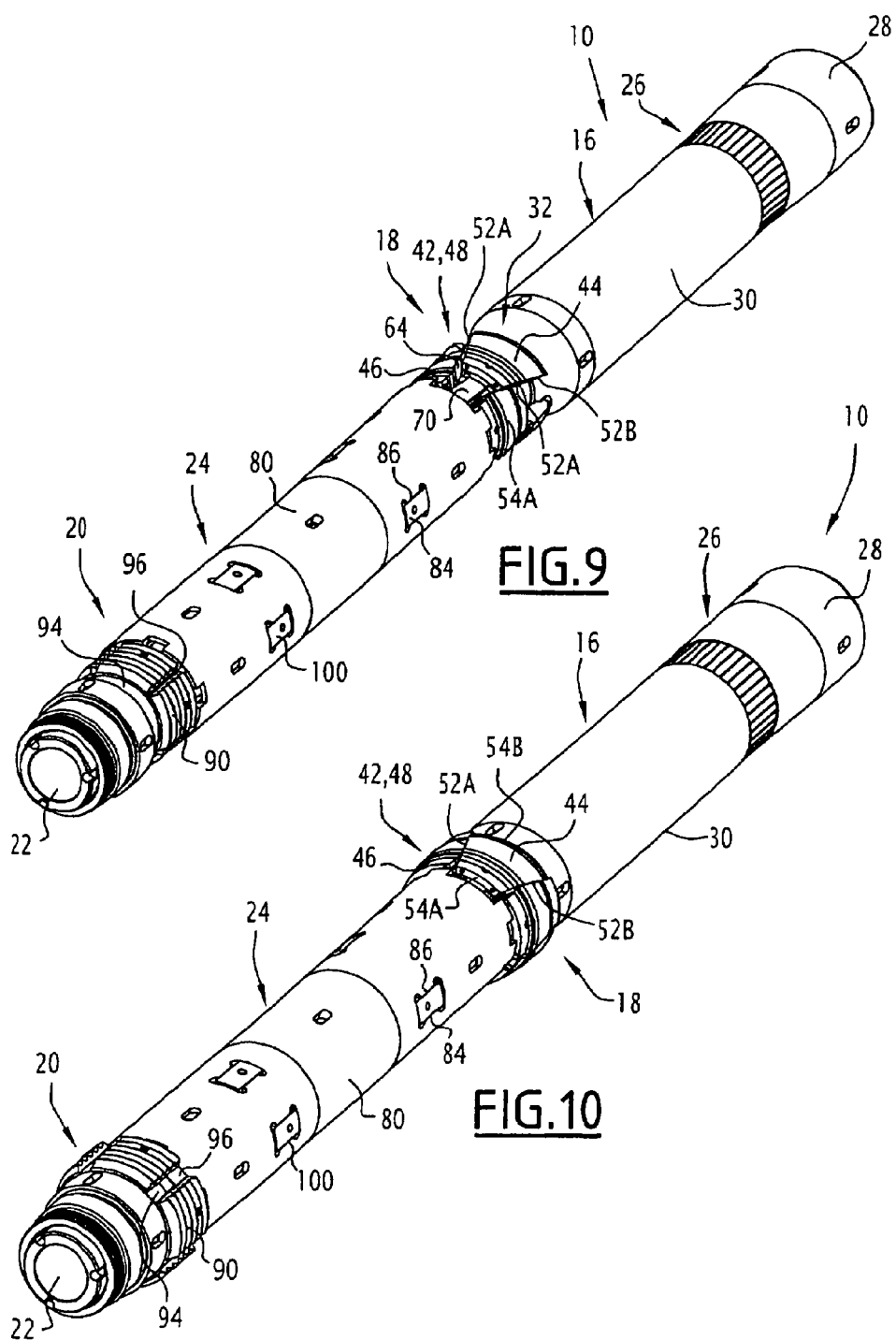

MANDREL TO BE INSERTED INTO A LIQUID CIRCULATION PIPE AND ASSOCIATED POSITIONING METHOD

The present invention relates to a mandrel to be inserted into a liquid circulation pipe, of the type comprising:
- a body having a longitudinal axis X-X';
- a radially expandable annular sealing element comprising a centring arrangement and an arrangement for closing the centring arrangement, it being possible to deploy each arrangement radially relative to the body between a contracted configuration and a dilated configuration, the annular sealing element defining a continuous peripheral surface for application against the pipe and a continuous peripheral surface for application against the body when the centring arrangement and the closure arrangement are in the dilated configurations thereof;
- a radially expandable anchoring element which is at a longitudinal distance from the annular sealing element, the anchoring element being displaceable between a retracted state and a deployed state in which it delimits at least one axial pipe;

sequencing means capable of radially deploying the centring arrangement and the anchoring element before the closure arrangement.

A mandrel of the above-mentioned type is known and is sold by BAKER HUGHES with the name NPR™. This mandrel comprises an annular sealing element and an anchoring element consisting of deployable anchoring dogs. The annular sealing element comprises three axially offset deformable annular seals. A first seal can be deployed radially at the same time as or after the anchoring dogs for centring the mandrel. The second and third annular seals can subsequently be deployed radially to implement sealing around the mandrel, between the body of the mandrel and the pipe.

A mandrel of this type is not entirely satisfactory. In particular, deploying the first seal at the same time as the anchoring dogs seals the annular space between the mandrel and the pipe substantially completely. When liquid under pressure circulates in the pipe, the first seal therefore promotes the appearance of a "piston effect" which attempts to displace the mandrel axially in the pipe. Axial displacement of this type makes precise positioning of the mandrel difficult, unreliable, and above all dangerous. Specifically, there is a risk of the mandrel being ejected, leading to deterioration of the seal, imprecise positioning, or an operating failure.

It is therefore an object of the invention to provide a mandrel which can be fixed tightly in a well in a safe, reliable, simple and precise manner even while a liquid under pressure is circulating around the mandrel in the well.

For this purpose, the invention relates to a mandrel of the above-mentioned type, characterised in that the centring arrangement has an at least partly dilated configuration in which it defines at least one axial passage which extends through the annular sealing element, the closure arrangement radially closing the or each axial passage as it is deployed from its contracted configuration to its dilated configuration, the anchoring element basically remaining in its deployed state when the closure arrangement is radially deployed.

The mandrel according to the invention may comprise one or more of the following features, taken individually or in any technically feasible combination(s):
- the body delimits a first surface for radially expanding the centring arrangement and the closure arrangement, and a second surface for radially expanding the anchoring arrangement which is longitudinally displaceable relative to the first radial expansion surface between:
  - a remote position in which the centring arrangement and the closure arrangement are in the contracted configurations thereof, the anchoring element being in the retracted state thereof;
  - an intermediate centring position in which the centring arrangement is in the at least partly dilated configuration thereof and the anchoring arrangement is in an at least partly deployed state, the or each axial passage and the or each axial pipe being unobstructed at least in part, and
  - a close closure position in which the closure arrangement is in the dilated configuration thereof to close the or each axial passage defined by the centring arrangement;
- the body comprises:
  - a sleeve which supports one of the first radial expansion surface or of the second radial expansion surface;
  - a tube which is slidingly mounted in the sleeve and supports the other of the first radial expansion surface or of the second radial expansion surface;
- the centring arrangement, the sealing arrangement and the anchoring element being slidingly mounted around the body without a frangible connection member being arranged between each of these parts;
- the first radial surface defines a first cam path for the radial expansion of the centring arrangement and a second cam path for the radial expansion of the closure arrangement having a profile which is distinct from that of the first cam path, the first cam path comprising a radial expansion step to cause the centring arrangement to pass from the contracted configuration thereof to the at least partly dilated configuration thereof, and a conical surface to cause the centring arrangement to expand radially into the dilated configuration thereof;
- the first radial expansion surface, the second radial expansion surface, the annular sealing arrangement, the anchoring arrangement and the sequencing means can be reversibly detached from the body to change the configuration between:
  - an upper functional configuration in which the first radial expansion surface and the annular sealing arrangement are positioned longitudinally above the second radial expansion surface and the anchoring arrangement; and
  - a lower functional configuration in which the first radial expansion surface and the annular sealing arrangement are positioned longitudinally below the second radial expansion surface and the anchoring arrangement;
- the sequencing means comprise a first member for resiliently urging the anchoring element towards the retracted state thereof, and a second member for resiliently urging the centring arrangement and the closure arrangement towards the contracted configurations thereof,
and the first urging member and the second urging member are initially prestressed and arranged in series between the first radial expansion surface and the second radial expansion surface, the first urging member having a level of stiffness and/or initial prestress which is different from that of the second urging member in order to enable the continuous sequential deployment of the centring arrangement, the anchoring element, then the closure arrangement;
- it comprises means for blocking the displacement of the first radial expansion surface at a distance from the second radial expansion surface, these blocking means only being able to be activated beyond the intermediate centring position;
- the blocking means comprise:

a first toothed surface which is integral with a first member supporting the first radial expansion surface;

a second toothed surface of pitch P which is integral with a second member supporting the second radial expansion surface;

at least N toothed rings, N being greater than 1, arranged between the first toothed surface and the second toothed surface, the rings having teeth, the pitch of which is offset longitudinally by P/N to engage the first toothed surface with the second toothed surface by successively and cyclically using each of the N rings as the first radial expansion surface is displaced towards the second radial expansion surface;

it comprises a traction support fixed on the manoeuvring tube by means of a frangible peripheral member, the traction support being detachable from the manoeuvring tube by piercing the frangible peripheral member along a periphery of the traction support, and the frangible peripheral member is a spring-loaded washer of constant thickness to be broken under the effect of a predetermined longitudinal separation force between the traction support and the manoeuvring tube;

the centring arrangement comprises a plurality of centring blocks at a lateral distance from one another about the longitudinal axis X-X' in the dilated configuration of the centring arrangement, the closure arrangement comprising a plurality of closure blocks fitted in a tight manner between the centring blocks in the dilated configuration thereof, and the anchoring element comprises a plurality of anchoring dogs distributed angularly about the longitudinal axis X-X';

the centring arrangement and the closure arrangement each comprise branches for radially urging each centring block and each closure block towards the longitudinal axis X-X', the anchoring element comprising branches for returning the dogs towards the longitudinal axis X-X';

the branches for radially urging the centring blocks and/or the return branches are associated with a longitudinal clearance in a cage which is mounted so as to slide longitudinally around the body.

The invention further relates to a method of positioning a mandrel as defined above into a liquid circulation pipe, characterised in that it comprises the following steps:

insertion of the mandrel in the pipe, the centring arrangement and the closure arrangement being in the contracted configurations thereof, the anchoring element being in the retracted state thereof; then:

radial deployment of the centring arrangement to the at least partly dilated configuration thereof, and of the anchoring arrangement to the deployed state thereof, to apply at least in part the anchoring element and the centring arrangement against an inner wall of the pipe and to hold the body at a distance from the inner wall, the or each axial passage and the or each axial pipe remaining unobstructed at least in part to allow a liquid to pass through the or each axial passage and through the or each axial pipe; followed by displacement of the closure arrangement to the dilated configuration thereof to close the or each axial passage and to define a peripheral surface for applying the annular sealing arrangement against the pipe and a peripheral surface for applying the annular sealing arrangement against the body, the surfaces being continuous over at least a periphery about the longitudinal axis X-X', and the anchoring element basically remaining in the deployed state thereof when the closure arrangement is radially deployed.

BRIEF DESCRIPTION OF THE DRAWINGS

The invention will be better understood upon reading the following description, given purely by way of example and made with reference to the appended drawings, in which:

FIG. 1 is a sectional view along a medial axial plane of a first mandrel according to the invention when it is introduced into a liquid circulation pipe;

FIG. 2 is a sectional view along the transverse plane II of FIG. 1;

FIG. 5 is a view analogous to FIG. 1 of the mandrel when the mandrel is anchored in the pipe;

FIG. 6 is a sectional view along the transverse plane VI of FIG. 5;

FIG. 7 is a view analogous to FIG. 1 of the mandrel after the sealing has been implemented;

FIG. 8 is a sectional view along the transverse plane VIII of FIG. 7

FIG. 9 is a perspective three quarter face view of the mandrel of FIG. 1;

FIG. 10 is a view analogous to FIG. 9 of the mandrel of FIG. 7;

DETAILED DESCRIPTION OF THE INVENTION

Figure 3:
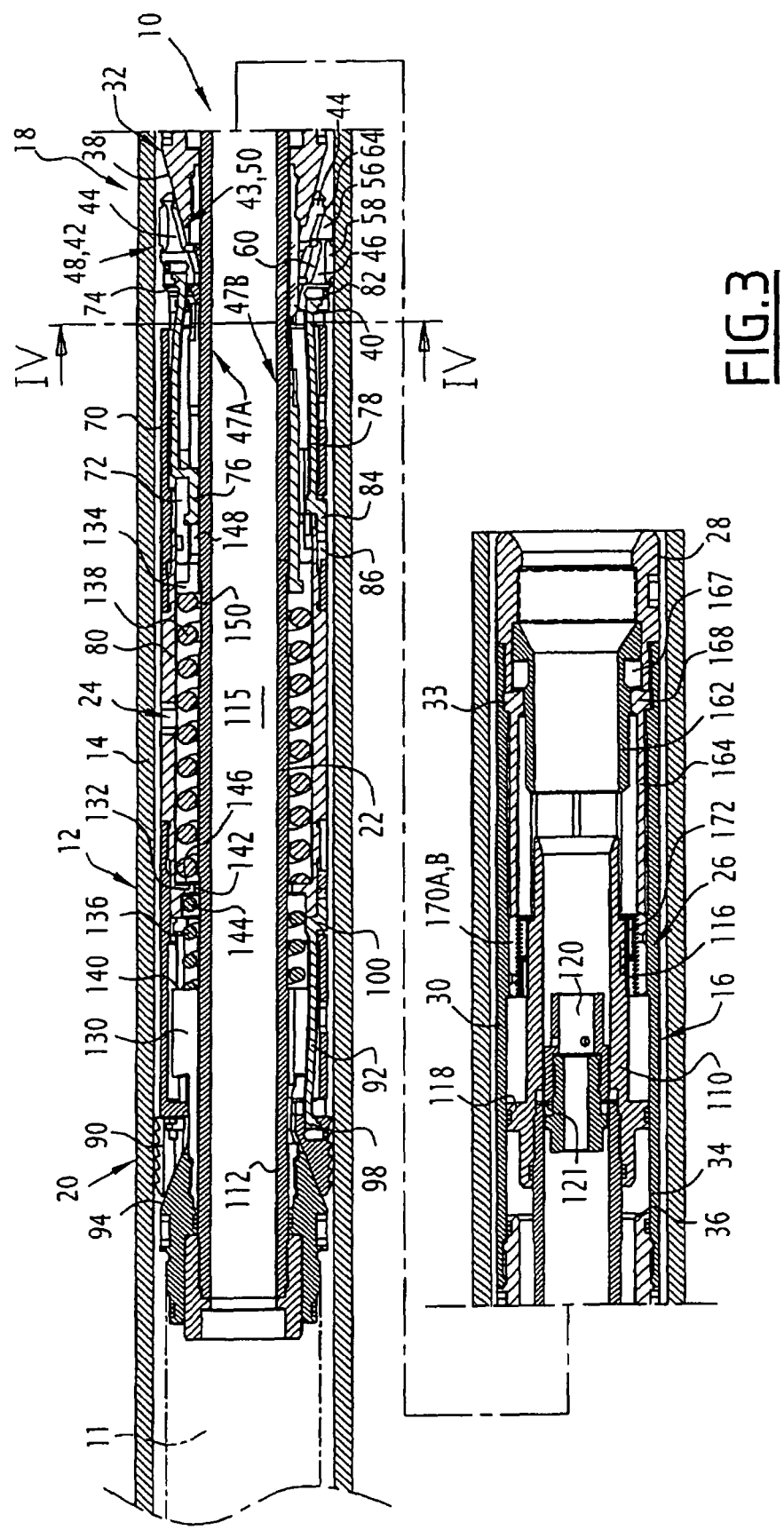
FIG. 3 is a view analogous to FIG. 1 when the mandrel is centred in the pipe.

The first example of a mandrel 10 according to the invention, shown in FIGS. 1 to 10, is to be introduced into a production pipe 12 of an oil well disposed underground, also known by the term "production tubing".

The mandrel 10 is to be fixed tightly in the pipe 12. The mandrel 10 has a lower arrangement 11 which may be a downhole tool, a valve, a junk pusher, a liquid bypass tube, or a plug, advantageously provided with a pressure equalisation system.

In the example shown in FIGS. 1 to 8, the pipe 12 has a substantially smooth inner wall 14 opposite the mandrel 10. The pipe 12 is thus without an annular anchoring throat, referred to as a "landing nipple".

As is shown in FIGS. 1 to 10, the mandrel 10 comprises, from top to bottom, an upper sleeve 16 having a longitudinal axis X-X', an annular sealing element 18 which can be deployed radially to produce a sealing barrier around the mandrel 10 on the inner wall 14, and a radially deployable anchoring arrangement 20 of the mandrel 10.

In this configuration, the mandrel 10 is primarily intended to be used in a well in which the pressure below the mandrel 10 is greater than the pressure above the mandrel 10. It could also potentially be used in a well in which the pressure below the mandrel 10 is slightly less than the pressure above the mandrel 10.

The mandrel 10 further comprises a manoeuvring tube 22 for the annular element 18 and the anchoring arrangement 20, means 24 (i.e., a sequencing arrangement) for sequencing the radial expansion of the element 18 and the arrangement 20, and means 26 for locking the manoeuvring tube 22 relative to the upper sleeve 16 (i.e., a blocking arrangement).

The upper sleeve 16 and the tube 22 form a substantially tubular body with axis X-X'.

The tubular sleeve 16 comprises, from top to bottom in FIG. 1, a cap 28 for connecting to a wireline work line via a positioning tool and to a removing tool (not shown), a hollow intermediate tubular part 30 and a radial expansion part 32, converging towards the bottom of the well, for supporting the annular sealing element 18.

In a variant, the cap 28 is able to receive a hollow tube ("coiled tubing") deployment line or a descending drill string.

In another variant, the cap forms an interface with a connection packer or "straddle packer" or with another mandrel 10 positioned in the same direction or in the opposite direction.

The sleeve 16 delimits, over the whole length thereof, an internal passage 34 of axis X-X' opening at the upper and lower ends of the sleeve 16.

The connection cap 28 comprises a throat for receiving a connector head for connecting to a wireline work line (not shown), for deploying the mandrel 10 in the well and retracting it from the well. The wireline work line is described in the Applicant's French application FR-A-2 848 363, for example.

The intermediate tubular part 30 is screwed under the cap 28. It defines, in the vicinity of the cap 28, an annular throat 33 for receiving releasable locking means 26. This annular throat 33 opens into the internal passage 34.

The tubular part 30 delimits, in the passage 34, in the vicinity of the radial expansion part 32, a lower stop 36 of the manoeuvring tube 22, as will be described in greater detail below.

The radial expansion part 32 has on the outside a conical upper surface 38 for application against the annular sealing element 18 and against centring steps 40 situated below said conical surface 38.

The conical surface 38 converges towards the bottom of the well. It extends over a periphery around the axis X-X'.

Each centring step 40 has a peripheral surface of constant diameter about the axis X-X' extending downwards in the extension of the conical surface 38. The step 40 has substantially the same thickness as the conical surface 38 at the lower end thereof.

The steps 40 are spaced from one another around the axis X-X'. Between them, they define notches delimited internally by the tube 22.

The radial expansion part 32 thus defines a first axial cam path extending from the bottom to the top along each step 40 and following the conical surface 38.

It defines a second axial cam path extending axially along the tube 22 in each notch between two steps 40, then along the conical surface 38.

As shown in FIG. 10, the annular sealing element 18 comprises, proceeding along an external peripheral surface 42 and an internal peripheral surface 43 around the longitudinal axis X-X', an alternating pattern of upper sealing blocks 44, forming a sealing arrangement of the mandrel 10, and a plurality of lower centring blocks 46, forming a mandrel centring arrangement 10.

The centring arrangement and the sealing arrangement each comprise means 47A, 47B for radially retracting each block 44, 46 against the manoeuvring tube 22, towards the axis X-X'.

The upper blocks 44 and the lower blocks 46 are disposed head-to-foot along the longitudinal axis X-X', as disclosed in the Applicant's French application No. 05 12435.

In the example shown in FIG. 10, the annular element 18 comprises three upper blocks 44 and three lower blocks 46. Each block 44, 46 delimits an external face 48 for application against the pipe 12, an internal face 50 for application against the sleeve 16 and two lateral expansion surfaces 52A, 52B connecting the faces 48 and 50.

Each block 44, 46 further comprises a lower surface 54A and an upper surface 54B substantially perpendicular to the axis X-X' in FIG. 10.

Each external face 48 is of a substantially cylindrical shape about the axis X-X' and forms part of the external peripheral surface 42. Each internal face 50 is of a conical shape converging towards the top along the axis X-X' and forms part of the internal peripheral surface 43. The internal faces 50 are of a form substantially conjugate to the conical surface 38 of the sleeve.

The lateral surfaces 52A, 52B are of a substantially helical shape with axis X-X'.

The lower blocks 46 and upper blocks 44 are of a generally trapezium shape as seen from the side, with the height of each trapezium parallel to the longitudinal axis X-X'.

Thus, the lateral surfaces 52A, 52B of each upper block 44 diverge from one another proceeding upwards along the axis X-X' whilst the lateral surfaces 52A, 52B of each lower block 46 converge towards one another proceeding in the same direction.

Each lock 44, 46 comprises a central metallic armature 56, an external packing 58 for sealing against the pipe 12, and an internal packing 60 for sealing against the sleeve 16, mounted on either side of the armature 56.

The armature 56 has a substantially I-shaped cross-section. It thus has an upper edge and a lower edge interconnected by a central core of a thickness less than those of the upper edge and lower edge.

The upper and lower edges, together with the central core, delimit an external annular recess and an internal annular recess which receive the packings 58 and 60 respectively. These recesses open laterally onto the lateral surfaces 52A, 52B of the block 44, 46 and are closed longitudinally by the upper edges and the lower edges. Thus, the flow of the packings 58, 60 is contained longitudinally in the internal and external recesses.

The upper edge comprises, on either side of the central core, lips which can be deformed axially and/or radially upwards when contacted with the inner wall of the pipe 12 and with the conical surface 38 of the sleeve 16 under the effect of the deformation of the packings 54, 56.

The armature 56 is produced from metal, for example. The packings 58, 60 are for example produced from elastomer or from plastic. The internal packing 58 is disposed in application against the conical surface 38, whilst the external packing 60 is to be applied against the inner wall 14 of the pipe 12. The packings 58, 60 are for example produced by overmoulding on the armature 56.

In a variant, the armature 56 may be produced from plastics material. In a further variant, the packings 58 may be produced from a metal softer than that of the armature 56, for example from lead.

As is shown in FIGS. 1 to 7, the lower centring blocks 46 are longitudinally and radially displaceable relative to the body on the first cam path, between a configuration contracted against the tube 22, a partly dilated centring configuration and a fully dilated configuration in application against the conical surface 38.

The upper sealing blocks 44 are radially and longitudinally displaceable in a manner coordinated with the lower blocks 46 relative to the body on the second cam path, between a radially contracted configuration, longitudinally offset above the lower blocks 46, and a fully dilated configuration nested between the lower blocks 46, as will be described in detail below.

In the contracted position thereof shown in FIGS. 1 to 9, the lower blocks 46 are disposed in application against the manoeuvring tube 22, under the step 40. The lower blocks 46 thus have minimal radial dimensions.

In this configuration, the upper blocks 44 also occupy the contracted position thereof, in partial application against the conical surface 38 and against the tube 22.

The upper blocks 44 are offset longitudinally upwards relative the lower blocks 46. Thus, the distance separating the upper surface of an upper block 44 from the upper surface of a lower block 46 is at a maximum, the blocks 44, 46 thus being in a spaced-apart position.

The annular element 18 is thus partially taken out and has minimal radial dimensions. In this configuration, the mandrel 10 can be transported safely and easily into the pipe 12, while limiting the risk of it sticking in the pipe 12 and facilitating the descent thereof against the flow of liquid passing through the pipe 12, and also protecting the annular arrangement 18.

In the partially dilated configuration thereof shown in FIG. 2, the lower blocks 46 have been longitudinally displaced upwards relative to the upper blocks 44 so as to come into application against a centring step 40 between two upper blocks 44. The lower blocks 46 are thus in a partly radially dilated configuration in which they form runners for application against the inner wall 14 of the pipe 12. The upper blocks 44 are kept in the substantially contracted configuration thereof, in the space freed by the radial expansion of the lower blocks 46.

Figure 4:
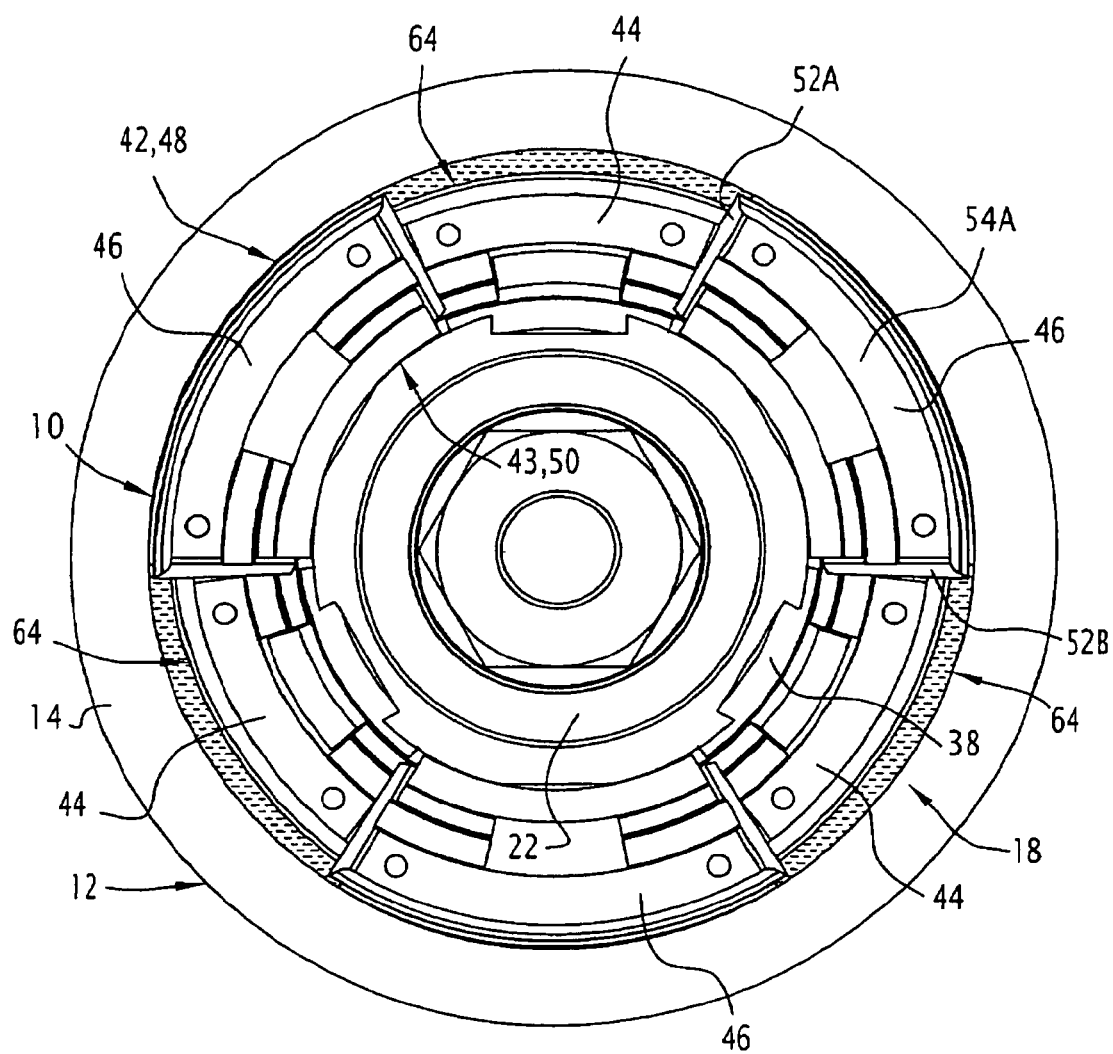
FIG. 4. is a sectional view along the transverse plane IV of FIG. 2.
Figure 11:
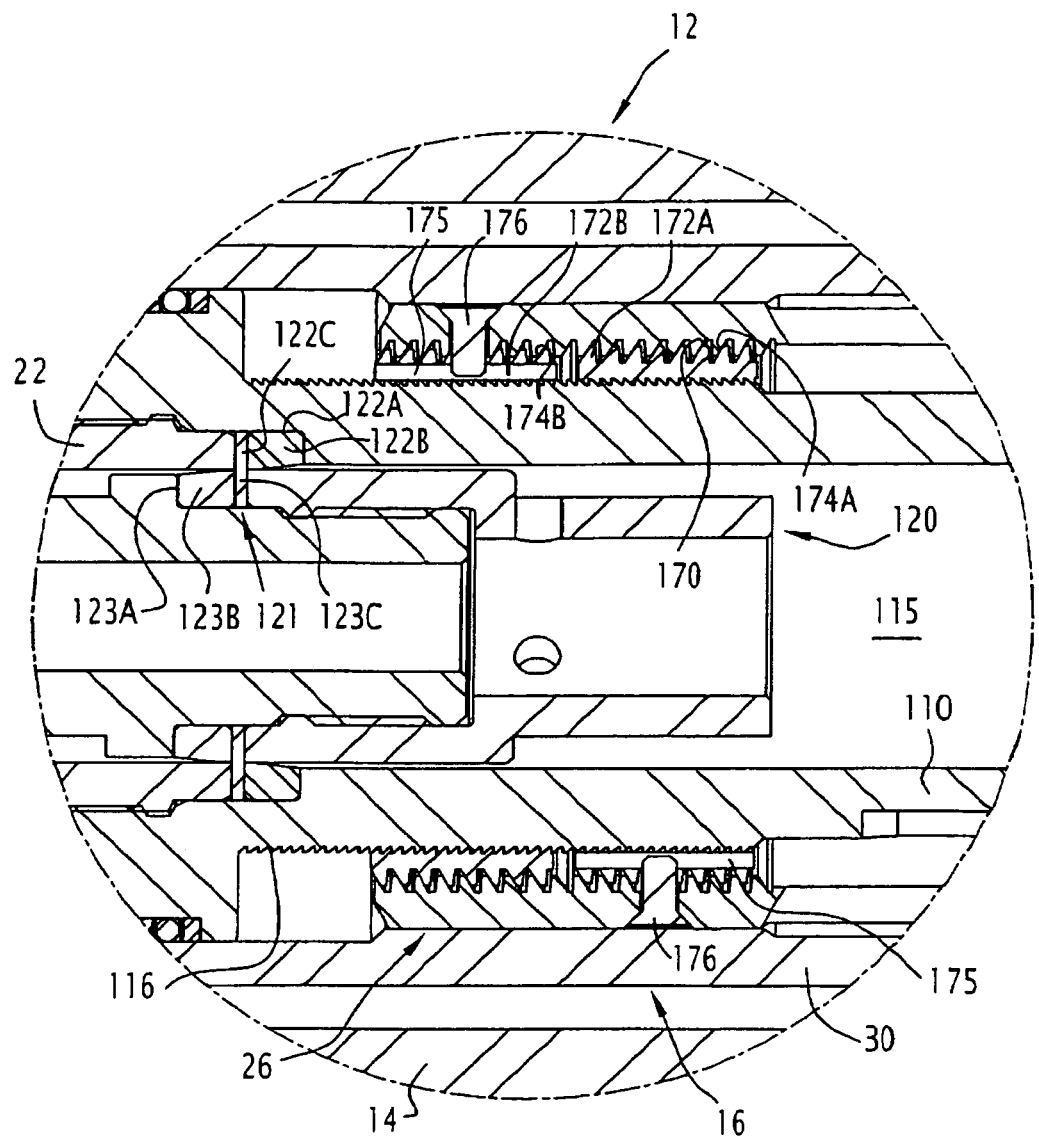
FIG. 11 is an enlarged view of a detail denoted XI in FIG. 7.

As shown by FIG. 4, the lower blocks 46 and the upper blocks 44 delimit between them, across the annular element 18, axial passages 64 for the circulation of a fluid in the form of axial notches. The passages 64 are partially disengaged for a fluid to pass through.

Each axial passage 64 extends laterally between the lateral edges 52A, 52B of two adjacent lower blocks 46. It is delimited towards the axis X-X' by the external face 48 of an upper block 46, situated radially close to the axis X-X' relative to the external faces 48 of the adjacent lower blocks 44.

These passages 64 thus extend across the annular arrangement 18 and open upwards and downwards across the annular arrangement 18, between two lower blocks 44. The passages 64 extend radially within the cylindrical volume defined by the external faces 48 of the lower blocks 44.

In the dilated configuration of the upper blocks 44 and the lower blocks 46 shown in FIGS. 7 and 10, the distance separating the upper edge of a lower block 46 from the upper edge of an adjacent upper block 44 is at a minimum and the blocks 44, 46 are in a close position nested in one another.

As will be seen below, nesting the lower blocks 46 between the upper blocks 44, by sliding the lateral surfaces 52A, 52B of the blocks 44, 46 on the lateral surfaces 52B, 52A of the adjacent blocks 46, 44, leads to radial expansion of the annular element 18 by a simultaneous radial and circumferential corner effect. The axial passages 64 delimited between the lower blocks 46 are thus completely closed by the upper blocks 44 to produce a sealing through the annular element 18, around the upper sleeve 16.

The annular element 18 thus has maximum radial dimensions with a substantially cylindrical external peripheral surface 42 continuous over at least a periphery around the axis X-X', and an internal peripheral surface 43 continuous over at least a periphery around the axis X-X'.

In the dilated configuration, the external and internal annular recesses in each block 44, 46 open respectively into the external and internal recesses in the adjacent blocks 44, 46 in such a way that the internal and external packings 58, 60 extend continuously on at least a periphery around the axis X-X'. The external packings 56 thus define the external peripheral surface 42 in application against the wall 14 of the pipe 12. The internal packings 60 define the internal peripheral surface 43 in application against the surface 38 of the sleeve 16, continuous over at least a periphery around the axis X-X'.

Further, each lateral end of an upper edge of a block 44, 46 is in at least partial application against the lateral end of an upper edge of an adjacent block 44, 46. Likewise, the lateral end of each lower edge of a block 44, 46 is applied against the lateral end of a lower edge of each adjacent block 44, 46. The internal and external annular recesses are thus longitudinally closed over the entire periphery of the annular element 18.

The ratio of the radial dimensions of the annular element 18 in the dilated configuration to the radial dimensions of the annular element 18 in the contracted configuration is thus between 1.05 and 1.50 and is preferably greater than 1.15. The annular element 18 in the contracted configuration is thus contained within the radial dimensions of said element in the dilated configuration, and advantageously within the radial dimensions of the sleeve 16.

The radial retraction means 47A for the upper blocks 44 comprise, for each block 44, a longitudinal upper retraction branch 70 and a lower annular base 72 connecting the branches 70.

Each branch 70 extends between an upper end 74 fixed to an upper block 44 and a lower end 76 integrated into the annular ring 72.

Each upper branch 70 is configured so as to pin the upper blocks 44 radially towards the axis X-X' against the conical surface 38 and the manoeuvring tube 22. The ring 72 and the lower ends 76 are mounted so as to slide longitudinally on the manoeuvring tube 22 below the centring steps 40 without being able to rotate about the axis X-X'.

The annular base 72 is mounted so as to slide longitudinally relative to the tube 22. It delimits longitudinal passages 86 for the sliding of the retraction means 47B of the lower blocks 46. There is no frangible connection member positioned between the tube 22 and the base 72.

The retraction means 47B of the lower blocks 46 comprise, for each block 46, a longitudinal retraction branch 78 and a peripheral liner 80 in which the longitudinal branches 78 are mounted.

The retraction branches 78 extend between an upper end 82 fixed to the lower blocks 46 and a lower end 84 connected by a slide of axis X-X' to the liner 80 across a passage 86.

The liner 80 is mounted so as to be movable longitudinally around the manoeuvring tube 22. It extends between the anchoring element 20 and the sealing element 18 to cover the tube 22 substantially completely. There is no frangible connection member positioned between the tube 22 and the liner 80.

The liner 80 extends opposite the retraction branches 78 and delimits longitudinal passages 86 of a length slightly greater than the lower end 84 of the lower branches 78. Slight axial sliding with axis X-X' of each end 84 in a passage 86 is possible, to allow a slight upward displacement of the lower blocks 46 under the effect of the pressure after the sealing has been produced around the mandrel 10.

The lower surface 54A of each lower block 46 is placed in application against the upper edge of the liner 80 during the positioning.

The anchoring element 20 is longitudinally offset relative to the annular sealing element 18. In this regard, the element 18 is situated in the vicinity of the upper end of the mandrel 10, whilst the anchoring element 20 is situated in the vicinity of the lower end of the mandrel 10 in a lower part of the manoeuvring tube 22.

The distance separating the anchoring element 20 from the sealing element 18 is greater than at least twice the external diameter of the sealing element in the dilated configuration of the blocks 44, 46.

The anchoring element 20 comprises a plurality of anchoring dogs 90 distributed angularly around the axis X-X', and for each dog 90, a branch 92 for urging the dog 90 radially towards the axis X-X'.

The anchoring dogs 90 have a toothed external peripheral surface for toothed engagement with the inner wall 14 of the pipe 12.

They have an upper surface placed in application under the lower edge of the liner 80 during positioning.

As will be seen below, the dogs 90 are radially deployable along a conical surface 94 of the tube 22, between a state retracted against the manoeuvring tube 22 and a radially deployed state, achieved before the closing of the axial passages 64 delimited between the lower blocks 46 and the upper blocks 44.

The lower conical surface 94 converges upwards and towards the upper conical surface 38.

In the deployed state, the dogs 90 delimit between them longitudinal pipes 96 allowing liquid to pass through.

The retraction branches 92 extend longitudinally upwards between a lower end 98 fixed to a dog 90 and an upper end 100 connected by a slide with axis X-X' to the retraction liner 80 above the lower edge thereof. The branches 92 urge the dogs 90 radially towards the axis X-X' against the lower conical surface 94 and against the tube 22.

The manoeuvring tube 22 is mounted so as to slide in the tubular sleeve 16. It comprises an upper part 10 disposed in the passage 34 and a lower part 112 which projects longitudinally downwards outside the sleeve 16. The lower arrangement 11 is screwed onto a lower end of the lower part 112.

The tube 22 defines a hollow central aperture 115 with axis X-X' which opens at the upper end thereof.

On the outside, the upper part 110 has a smooth upper region and a lower region provided with ratchet toothing 116 of pitch P to cooperate with the locking means 26, as will be seen below.

The upper part 110 is delimited below by an annular rib 118 which can cooperate with the lower stop 36 to prevent the downward displacement of the tube 22 beyond a lower position. The rib 118 forms an application piston making it possible to reduce the force exerted by the differential pressure applied to the mandrel 10 on the locking means 26.

The tube 22 further comprises a traction support 120 disposed in the aperture 115 for engaging the positioning tool.

The traction support 120 is placed in the vicinity of the rib 118. It is connected to the wall of the manoeuvring tube 22 by a calibrated frangible disc 121.

The wall of the tube 22 defines an external annular recess 122A. The recess 122A receives a shear matrix 122B and an external part 122C of the frangible disc 121 placed below the matrix 122B.

The support wall 120 defines an internal annular recess 123A, positioned opposite the external recess 122A. The recess 122A receives an annular compacting punch 123B and an internal part 123C of the disc 121. The punch 123B and the matrix 122B are advantageously produced from ceramics.

The disc 121 can be cut between the external part 122C thereof and the internal part 123C thereof, by punching along the periphery of the support 120, to release the tube 22 from the support 120.

The cutting by punching makes it possible to control in a simple manner the breaking force necessary to cut the disc 121 by selecting the thickness and the material forming the disc 121. This cutting is clean and avoids the presence of debris in the tube 22 after cutting and allows the internal surface of the tube 22 to be kept smooth, avoiding singularities in the flow, which are causes of erosion.

The manoeuvring tube 22 is movable longitudinally relative to the sleeve 16 between a lower rest position (FIG. 1) in which the upper blocks 44 and lower blocks 46 are in the contracted position thereof, a first intermediate centring position (FIG. 3) in which the lower blocks 46 are in the partially dilated position thereof in application against the centring steps 40, a second intermediate anchoring position (FIG. 5) in which the anchoring dogs 90 are in the deployed state thereof and the axial passages 64 remain unengaged, and an upper sealing position (FIG. 7) in which the upper blocks 44 and the lower blocks 46 are nested in one another and form a sealed annular assembly around the sleeve 16 to close the axial passages 64.

As will be seen below, the sequencing means 24 further comprise a lower spring 136 for urging the anchoring dogs 90 towards the retracted state thereof and an upper spring 138 for urging the lower blocks 46 and upper blocks 44 towards the contracted configuration thereof.

The lower stop 130 extends around the manoeuvring tube 22, above the lower arrangement 11.

It is covered in part by the liner 80 and extends opposite branches 92 for retracting the dogs on the conical surfaces 90. The lower stop 130 has an upper radial surface 140 for application of the lower spring 136.

The intermediate stop 132 is integral with the liner 80. It projects radially towards the tube 22 from the liner 80. It has an internal peripheral surface 142 which is applied against the tube 22, and on either side of the surface 142, a lower radial surface 144 for application of the lower spring 136 and an upper radial surface 146 for application of the upper spring 138.

The upper stop 134 integral with the sleeve 16 extends below the conical surface 38 and below the step 40 around the manoeuvring tube 22. The stop 134 internally delimits passages 148 for the sliding of the lower ends 76 of the longitudinal branches 70 for retracting the upper blocks 44, in which the lower ends 76 are received so as to slide longitudinally.

The upper stop 134 has a lower surface 150 for application of the upper spring 138.

The springs 136, 138 are mounted in series. They are initially kept prestressed, between the stops 130 and 132 and between the stops 132 and 134 respectively, in the lower, rest position of the tube 22.

The lower spring 136 is a helical spring or a spring with corrugated coils. It is mounted radially between the manoeuvring tube 22 and the external liner 80. It is applied longitudinally against the upper surface 140 of the lower stop 130 on the one hand, and against the lower application surface 144 of the mobile intermediate stop 144 on the other.

The upper spring 138 is also a helical spring or a spring with corrugated coils. It is mounted radially between the manoeuvring tube 22 and the liner 80. It is applied longitudinally against the upper surface 146 of the intermediate stop 132 on the one hand and against the lower surface 150 of the upper stop 134 on the other.

The respective stiffnesses of the springs 136, 138 and/or the respective initial prestresses applied to the springs 136, 138 are selected so as to be significantly different so as to achieve a sequential deployment of the lower blocks 46, the anchoring dogs 90 and the upper blocks 44 without shocks.

In this example, the stiffness of the lower spring 136 is selected so as to be 1.3 times greater than the stiffness of the upper spring 138, and the prestresses of the lower spring 136 and of the upper spring 138 are substantially equal.

The sequencing means 24 do not have any frangible connecting member. Thus, the lower blocks 46, the upper blocks 44 and the anchoring element 20 are mounted so as to slide around the tube 22 and the sleeve 16, without a frangible connection member being positioned in between, the deployment sequencing being achieved purely by the selection of the stiffness ratio of the springs 136, 138 and/or the ratio of the initial prestresses thereof.

The locking means 26 comprise, at the top and bottom in FIGS. 1, 3, 5, 7 and 11, a ring 162 for releasing the tube 22 and a clamp 164 for locking the tube 22.

The release ring 162 is formed by a substantially cylindrical sleeve.

The ring 162 is displaceable between an upper position holding the clamp 164 and a lower position releasing said clamp 164 by resilient retraction. It externally delimits an annular recess 167.

The clamp 164 is also of a tubular shape. It comprises an upper locking flange 168 for locking the longitudinal position and an internal toothed surface 170 for engaging with the axially slotted tube 22.

An axially slotted upper ring 172A and an axially slotted lower ring 172B are engaged outside in the toothed internal surface 170, between this surface 170 and the tube 22. Each intermediate ring 172A, 172B has an internal surface for engaging with the tube 22 and a toothed external surface 174A, 174B.

The toothed surfaces 174A, 174B are of the same pitch "P", equal to the pitch of the toothing 116. However, the surfaces 17A, 174B are screwed into the toothed surface 170 with the toothings thereof having a longitudinal offset of a half-pitch "P/2" to allow successive cyclic engagement of the toothing 116 with each of the toothed surfaces 174A, 174B.

A peg 176A, 176B introduced into each slot on either side of the toothed surface 170 maintains the angular position of each ring 172A, 172B relative to the toothed surface 170.

The locking clamp 164 is movable axially between an upper position blocking the tube 22, in which the flange 168 is received in the annular throat 33 of the sleeve 16, and a lower position in which the flange 168 is received in the recess 167 of the release ring.

The functioning of the mandrel 10 according to the invention will now be described.

Initially, as shown in FIG. 1, the mandrel 10 is positioned in a descent configuration in the pipe 12.

For this purpose, the tube 22 is placed in the lower, rest position thereof, in which the distance separating the upper conical surface 38 on the sleeve 16 and the lower conical surface 94 on the tube 22 is at a maximum.

In this position, the annular rib 118 is disposed in application against the stop 36. The retraction springs 136 and 138 hold the tube 22 in the lower position thereof due to the prestress of said springs.

The lower blocks 46 and the upper blocks 44 are in the contracted configuration thereof against the tube 22. Thus, the lower blocks 46 are held in application against the tube 22 under the step 40 by the lower branches 78. The upper blocks 44 are offset longitudinally upwards relative to the lower blocks 46.

The upper blocks 44 are also applied against the tube 22 under the radial retraction effect caused by the upper branches 70. The annular arrangement 18 thus takes up minimal radial dimensions, less than or equal to the maximum radial dimensions of the body 16, 22 and of the liner 80.

Likewise, the retraction branches 92 hold the anchoring dogs 90 in application against the tube 22 above the conical surface 94. The dogs 90 are thus in the retracted state thereof, allowing easy descent in the pipe 12 without any risk of damaging the annular element 18 and the dogs 90.

The minimum gap between the mandrel 10 and the inner wall 14 of the pipe 12 is maximised and sufficiently wide to limit problems due to the displacement of the mandrel 10 against the flow of liquid present in the pipe 12, or prevents the mandrel 10 from being dragged along by a current.

In this descent configuration, the release ring 162 is disposed in such a way that the annular recess 167 extends above the upper flange 168 of the locking clamp 164, which flange is locked in position in the annular throat 33.

A positioning tool is furthermore inserted into the central aperture 115 before the descent into the well to cooperate with the traction support 120 and the connection cap 28.

This tool thus has a fixed part (not shown) in application against and/or hooked onto the cap 28 and a movable part (not shown) embedded in the traction support 120.

The mandrel 10 is thus lowered into the pipe 12 by hooking the positioning tool on a work line.

When the mandrel 10 reaches a desired position in the well, the positioning tool displaces the traction support 120 upwards while keeping the sleeve 16 longitudinally fixed relative to the pipe 12. The tube 22 thus passes from the rest position thereof to the first intermediate centring position thereof, shown in FIG. 3.

During this displacement, the upper blocks 44 and the lower blocks 46 are displaced upwards together. The lower blocks 44 are displaced on the centring step 40, leading to the partial radial expansion thereof, so as to come into partial application against the inner wall 14 of the pipe 12.

The upper blocks 44 are inserted into the space cleared by the radial expansion of the lower blocks 46.

When the manoeuvring tube 22 is displaced upwards, the lower spring 136 is compressed preferably between the stops 130, 132 relative to the upper spring 138, taking into account the stiffnesses and/or initial prestresses thereof. Thus, the path on which the lower stop 130 approaches the intermediate stop 132 is higher than the path on which the intermediate stop 132 approaches the upper stop 134.

This leads to displacement of the anchoring dogs 90 on the conical surface 94 to cause partial radial expansion of these dogs 90, simultaneously with the deployment of the lower blocks 46 in the at least partially dilated configuration thereof without shocks.

As the lower blocks 46 and the dogs 90 are deployed radially, they constitute runners for radially centring the mandrel 10. This makes it possible to centre the axis X-X' of the mandrel relative to the axis of the pipe 12. However, this centring is performed by leaving partially clear the axial passages 64 which are delimited between the partially dilated lower blocks 46 and the contracted upper blocks 44, and the flow pipes 96 between the free dogs 90. It is therefore possible for liquid to flow around the mandrel 10 through the passages 64 and the pipes 96. This flow of liquid limits the piston effect which might be obtained if the pipe 12 were completely closed by the mandrel 10 while said mandrel was not yet anchored.

When the tube 22 is displaced between the rest position and the centring position, the upper part 110 of the tube rises up into the locking clamp 164. However, the external toothing 116 of the upper part 110 remains located under the internal toothed surface 170A, allowing the tube 22 to return to the rest position thereof, if the position of the mandrel needs to be changed or in case the positioning tool fails.

Then, the tube 22 is displaced further upwards relative to the sleeve 16 to reach the second intermediate anchoring position thereof as shown in FIG. 5.

When it is displaced, the preferential compression of the lower spring 136 continues. This compression is greater than that of the upper spring 138 because of the difference in stiffness. Thus, the blocks 44, 46 remain substantially unmoveable relative to the conical surface 38 and the step 40, whilst the radial expansion of the dogs 90 continues with relative upward sliding of the conical surface 94 under the dogs 90.

The anchoring dogs 90 thus penetrate into the wall 14 to produce effective fixing of the mandrel 10 in position in the pipe 12, by indentation and slight radial deformation of the tube 14.

During this fixing, the mandrel 10 is kept centred relative to the axis of the pipe by the partially dilated configuration of the lower blocks 46.

After this initial fixing, the relative displacement of the tube 22 relative to the sleeve 16 continues in that the sleeve 16 is displaced downwards, the tube 22 remaining fixed relative to the pipe 12, stopped against the dogs.

When the tube 22 is displaced between the anchoring position and the sealing position, the upper retraction spring 138 is compressed between the upper stop 134 and the intermediate stop 132, leading to longitudinal displacement of the upper blocks 44 towards the lower blocks 46, then radial expansion of the upper blocks 44 along the conical surface 38 to reach the dilated configuration thereof in application against the inner wall 14 of the pipe 12.

At the same time, the conical surface 38 reaches the lower blocks 46, producing a relative longitudinal displacement of the blocks 46 relative to the upper blocks 44. The blocks 46 thus penetrate between the upper blocks 44 to close the axial passages 64 and produce the sealing around the annular element 18.

Thus, when the upper blocks 44 and the lower blocks 46 are in the completely dilated configuration thereof, nested inside one another, the external peripheral surface 42 of the annular element 18, formed by the peripheral faces 50 for application against the pipe 14, continues over at least one periphery around the axis X-X'.

This external peripheral surface 42 is applied against the internal wall 14 to produce the sealing around the mandrel 10. The continuity of the external peripheral surface 42 is provided by the triaxial compression of the external packings 58 in the external annular recesses.

Furthermore, the internal peripheral faces 50 of the blocks 44, 46 are applied by deformation against the conical surface 38. The internal peripheral surface 43 of the annular sealing element 18, formed by the internal peripheral faces 50, is continuous over at least a periphery around the axis X-X'. This internal peripheral surface 43 is applied against the application surface 38 of the sleeve 16 to produce the sealing between the annular element 18 and the sleeve 16.

The tube 22 thus takes up the upper sealing position shown in FIG. 7. In this position, the distance separating the upper conical surface 38 from the lower conical surface 94 is at a minimum.

During this displacement, the toothing 116 of the tube 22 engages in the intermediate rings 172A, 172B in such a way that the clamp 164 and the tube 22 are in a ratchet engagement. The return of the tube 22 towards the rest position thereof is thus prevented with a minimum play, taking into account the cyclic engagement in each of the rings 172A, 172B.

Then the frangible disc 121 between the traction support 120 and the tube 22 is broken and the positioning tool is retracted from the well with the support 120.

The tube 22 thus takes up the upper sealing position thereof shown in FIG. 7. In this position, the distance which separates the upper conical surface 38 from the lower conical surface 94 is at a minimum.

When the mandrel 10 needs to be detached from the pipe 12, a tool (not shown) is introduced into the passage 115 to lead to the downward displacement of the ring 162 relative to the cap 28. In the lower position of the ring 162, the flanges 168 penetrate into the recesses 167 and are extracted from the annular throats 33.

The arrangement formed by the release ring 162, the locking clamp 164, the slotted rings 172A, 172B and the tube 22 is thus free to slide downwards in the passage 34. Under the effect of the springs 136, 138, the tube 22 is also displaced downwards, from the upper position thereof to the second, intermediate position thereof, then into the initial position thereof, until the annular rib 118 butts against the stop 36.

During this phase, there is no relative displacement between the tube 22 and the locking clamp 164.

The downward displacement of the tube 22 relative to the sleeve 16 leads to the radial retraction of the anchoring dogs 90 by a relative upward sliding movement on the lower conical surface 94. Likewise, the upper blocks 44, 46 are displaced downwards relative to the upper conical surface 38.

Furthermore, the release of the springs 136, 138 leads to the downward displacement of the tube 22 and the upward displacement of the sleeve 16 relative to the liner 80. Thus, the upper. spring 138 pushes the sleeve 16 upwards, and then the annular base 72, to displace the lower blocks 46 longitudinally relative to the upper blocks 44 and thus to lead to the disconnection of the annular element 18 and the release of the axial passages 64.

The lower blocks 46 and the upper blocks 44 are then in the contracted configuration thereof and the anchoring dogs 90 are in the retracted state thereof.

It is thus straightforward to raise the mandrel 10 towards the surface in the pipe 12.

Furthermore, the mandrel 10 can also be configured for use principally in a well where the pressure above the mandrel is greater than below the mandrel 10. It could possibly be used in a well in which the pressure above the mandrel 10 is slightly less than the pressure under the mandrel 10.

Figure 12:
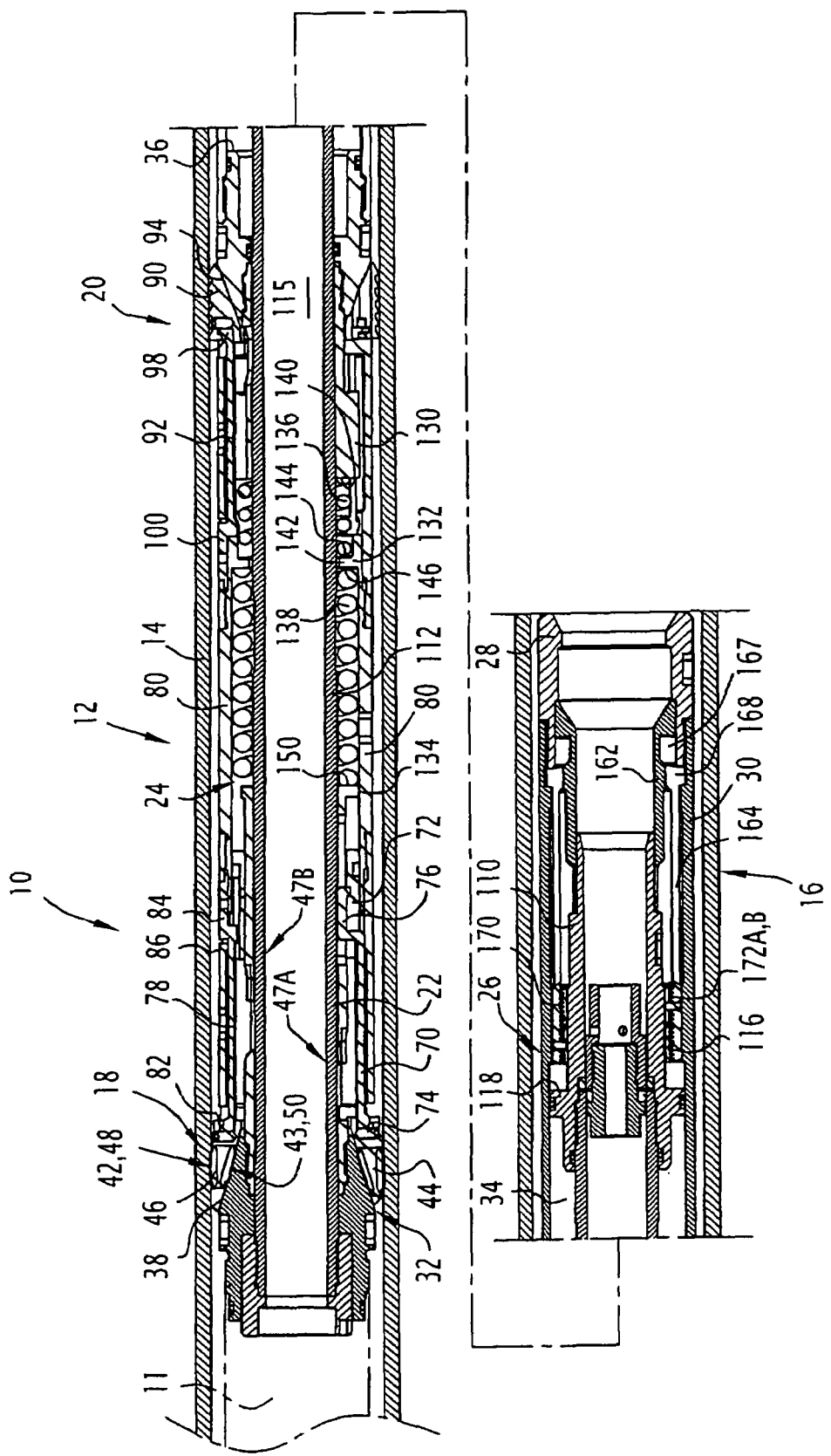
FIG. 12 is a view analogous to FIG. 7 in which the sealing element and the anchoring element of the mandrel have been reversed.
Figure 13:
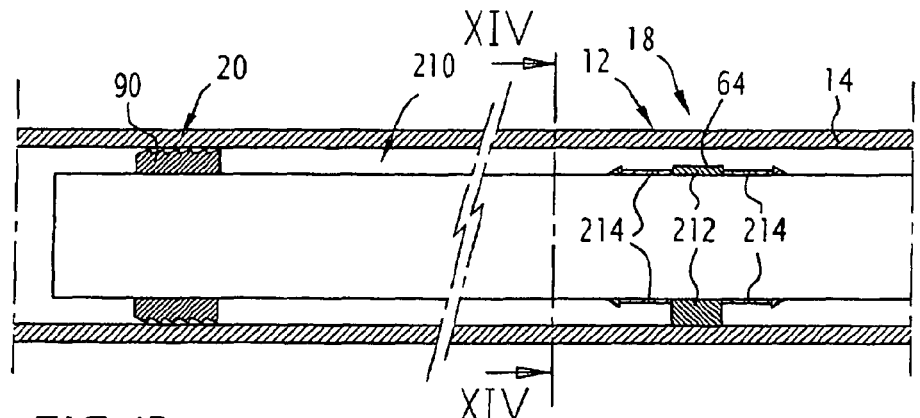
FIG. 13 is a schematic view of a second mandrel according to the invention.
Figure 14:
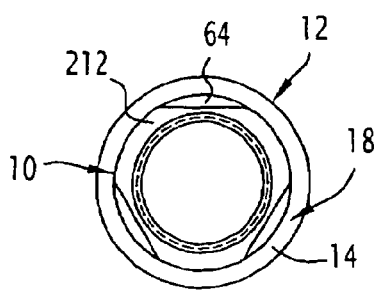
FIG. 14 is a sectional view along the transverse plane XIV of FIG. 13.
Figure 15:
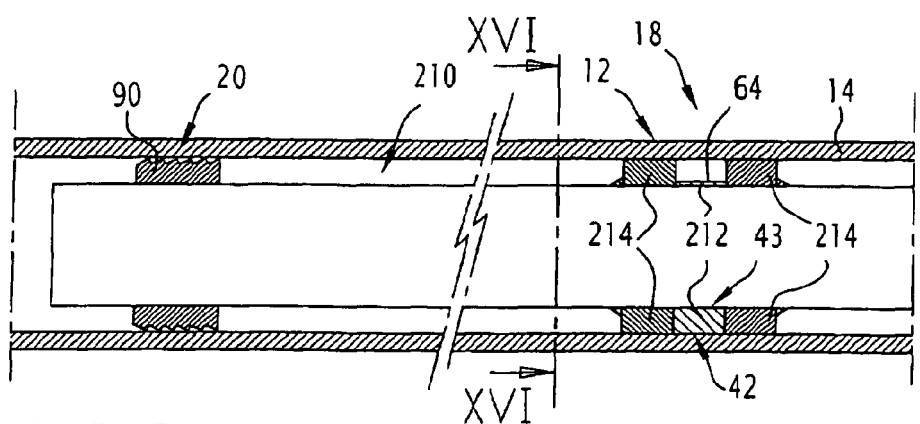
FIG. 15 is a view analogous to FIG. 13 after the sealing has been implemented.
Figure 16:
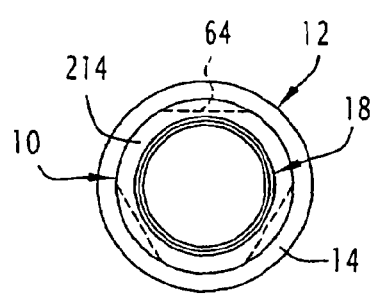
FIG. 16 is a sectional view along the transverse plane XVI of FIG. 15.

Thus, as shown in FIG. 12, the first radial expansion surface 32, the second radial expansion surface 94, the annular sealing arrangement 18, the anchoring arrangement 20 and the sequencing means 24 can be reversibly disassembled relative to the mandrel 16 and the tube 22, between the upper functional configuration shown in FIGS. 1 to 10 and the lower functional configuration shown in FIG. 12.

In the lower functional configuration, the first radial expansion surface 32 and the annular sealing arrangement 18 have been inverted in a plane transverse to the axis X-X' and have been mounted on the lower end of the tube 22.

In this configuration, the first radial expansion surface 32 has a conical part 38 converging upwards. The centring blocks 46 and disposed above the sealing blocks 44.

Likewise, the second radial expansion surface 94 is screwed to the lower end of the hollow, tubular part 30 of the sleeve 16, replacing the first radial expansion surface 32. This second surface 94 converges downwards from then on.

The anchoring dogs 90 have been raised above the annular sealing arrangement to be positioned in application against the second radial expansion surface 94.

The liner 80 has been inverted and the spring 136 with a high stiffness has been placed under the spring 138 with a low stiffness.

The operation of the mandrel 10 remains the same.

The fact that this type of assembly can be reversed makes it equally possible to use the mandrel 10 in either of these functional configurations, without having to alter either the construction or the components thereof.

In the variant shown in FIGS. 13 to 16, the second mandrel 210 according to the invention comprises an annular sealing element 18 consisting of an annular centring packing 212 which can be deployed radially and by two annular closing packings 214 which can be deployed radially, placed longitudinally on either side of the annular centring packing 212.

Each packing 212, 214 can be deployed between a contracted configuration against the sleeve 16 and a dilated configuration in which they occupy a maximum diameter.

In the dilated configuration thereof, the centring packing 212 delimits three axial passages 64 spaced around the axis X-X'. The axial passages 64 extend through the packing 212 between an upper surface and a lower surface of the centring packing 212 where they open. They form longitudinal notches opening radially outwards.

The packings 214 are disposed on either side of the axial passages 64. In the contracted configuration of the packings 214, the axial passages 64 are clear, whereas in the dilated configuration thereof, the packings 214 close the axial passage 64 upwards and downwards.

The second mandrel 210 according to the invention operates similarly to the first mandrel. Thus, initially, the centring packing 212 and the anchoring dogs 90 are radially deployed at least partially to provide centring of the axis X-X' of the mandrel 10 relative to the axis of the pipe 12, via contact between the inner wall 14 and the packing 214 and the dogs 90.

In this configuration, the annular closing packings 214 are held in the substantially retracted configuration thereof to keep the axial passages 64 clear.

Then, the anchoring dogs 90 are deployed substantially completely to provide fixing of the mandrel in the wall 14 of the pipe 12 while leaving the axial passages 64 clear. This avoids the piston affect during fixing.

Subsequently, the packings 214 located on either side of the centring packing 212 are deployed radially for application against the wall 14 of the pipe and against the upper surface and the lower surface of the centring packing 212. This leads to sealing between the sleeve 16 and the pipe 12 on the one hand, and to closing of the axial passages 64 of the centring packing 212 on the other hand.

In the examples shown, the centring arrangement and the closing arrangement of the annular sealing element are longitudinally adjacent, i.e. the longitudinal distance separating the centring arrangement from the closing arrangement is zero or is reduced, for example is less than the maximum diameter of the deployed annular sealing element.

The invention claimed is:

1. A mandrel to be inserted into a liquid circulation pipe, the mandrel comprising:
    a body having a longitudinal axis;
    a radially expandable annular sealing element comprising a centring arrangement and a closure arrangement for closing the centring arrangement, each arrangement being radially deployable relative to the body between a contracted configuration and a dilated configuration, the annular sealing element defining a continuous peripheral surface for application against the pipe and a continuous peripheral surface for application against the body when the centring arrangement and the closure arrangement are in the dilated configurations thereof;
    a radially expandable anchoring element which is at a longitudinal distance from the annular sealing arrangement, the anchoring element being displaceable between a refracted state and a deployed state in which the anchoring element delimits at least one axial pipe; and
    a sequencing arrangement capable of radially deploying the centring arrangement and the anchoring element before the closure arrangement;
    wherein the centring arrangement has an at least partly dilated configuration in which the centring arrangement defines at least one axial passage which extends through the annular sealing element, the closure arrangement radially closing the at least one axial passage as the closure arrangement is deployed from the contracted configuration thereof to the dilated configuration thereof, the anchoring element remaining in the deployed state thereof when the closure arrangement is radially deployed,
    wherein the body delimits a first radial expansion surface for radially expanding the centring arrangement and the closure arrangement, and a second radial expansion surface for radially expanding the anchoring arrangement which is longitudinally displaceable relative to the first radial expansion surface between
        a remote position in which the centring arrangement and the closure arrangement are in the contracted configurations thereof, the anchoring element being in the retracted state thereof,
        an intermediate centring position in which the centring arrangement is in the at least partly dilated configuration thereof and the anchoring arrangement is in an at least partly deployed state, the at least one axial passage and the at least one axial pipe being unobstructed at least in part, and
        a close closure position in which the closure arrangement is in the dilated configuration thereof to close the at least one axial passage defined by the centring arrangement,
    wherein the sequencing arrangement comprises a first member for resiliently urging the anchoring element towards the retracted state thereof, and a second member for resiliently urging the centring arrangement and the closure arrangement towards the contracted configurations thereof, and wherein the first urging member and the second urging member are initially prestressed and arranged in series between the first radial expansion surface and the second radial expansion surface, the first urging member having a level of stiffness and/or initial prestress which is different from a level of stiffness and/or initial prestress of the second urging member in order to enable continuous sequential deployment of the centring arrangement, the anchoring element, and then the closure arrangement.

2. The mandrel according to claim 1, wherein the body comprises:
a sleeve which supports one of the first radial expansion surface and the second radial expansion surface; and
a tube which is slidingly mounted in the sleeve and supports the other of the first radial expansion surface and the second radial expansion surface, the centring arrangement, the sealing arrangement and the anchoring element being slidingly mounted around the body without a frangible connection member being arranged between each of the centring arrangement, the sealing arrangement and the anchoring element.

3. The mandrel according to claim 1, wherein the first radial expansion surface defines a first cam path for the radial expansion of the centring arrangement and a second cam path for the radial expansion of the closure arrangement having a profile which is distinct from a profile of the first cam path, the first cam path comprising a radial expansion step to cause the centring arrangement to pass from the contracted configuration thereof to the at least partly dilated configuration thereof, and a conical surface to cause the centring arrangement to expand radially into the dilated configuration thereof.

4. The mandrel according to claim 1, wherein the first radial expansion surface, the second radial expansion surface, the annular sealing arrangement, the anchoring arrangement and the sequencing arrangement can be reversibly detached from the body to change a configuration between:
an upper functional configuration in which the first radial expansion surface and the annular sealing arrangement are positioned longitudinally above the second radial expansion surface and the anchoring arrangement; and
a lower functional configuration in which the first radial expansion surface and the annular sealing arrangement are positioned longitudinally below the second radial expansion surface and the anchoring arrangement.

5. The mandrel according to claim 1, further comprising:
a blocking arrangement for blocking the displacement of the first radial expansion surface at a distance from the second radial expansion surface, the blocking arrangement only being able to be activated beyond the intermediate centring position.

6. The mandrel according to claim 5, wherein the blocking arrangement comprises:
a first toothed surface which is integral with a first member supporting the first radial expansion surface;
a second toothed surface of pitch P which is integral with a second member supporting the second radial expansion surface; and
at least N toothed rings, N being greater than 1, arranged between the first toothed surface and the second toothed surface, the rings having teeth, the pitch of which is offset longitudinally by P/N to engage the first toothed surface with the second toothed surface by successively and cyclically using each of the N rings as the first radial expansion surface is displaced towards the second radial expansion surface.

7. The mandrel according to claim 1, further comprising:
a traction support fixed on a manoeuvring tube by means of a frangible peripheral member, the traction support being detachable from the manoeuvring tube by piercing the frangible peripheral member along a periphery of the traction support, wherein the frangible peripheral member is a spring-loaded washer of constant thickness to be broken under the effect of a predetermined longitudinal separation force between the traction support and the manoeuvring tube.

8. The mandrel according to claim 1, wherein the centring arrangement comprises a plurality of centring blocks at a lateral distance from one another about the longitudinal axis in the dilated configuration of the centring arrangement, the closure arrangement comprising a plurality of closure blocks fitted between the centring blocks in the dilated configuration thereof, and wherein the anchoring element comprises a plurality of anchoring dogs distributed angularly about the longitudinal axis.

9. The mandrel according to claim 8, wherein the centring arrangement and the closure arrangement each comprise branches for radially urging each centring block and each closure block towards the longitudinal axis, the anchoring element comprising branches for returning the dogs towards the longitudinal axis.

10. The mandrel according to claim 9, wherein the branches for radially urging the centring blocks and/or the branches for returning the dogs are associated with a longitudinal clearance in a cage which is mounted so as to slide longitudinally around the body.

11. The mandrel according to claim 1, wherein, in the contracted configuration, radial dimensions of the annular arrangement are smaller than or equal to maximum radial dimensions of the body.

12. The mandrel according to claim 1, wherein the annular sealing element comprises, proceeding along an external peripheral surface and an internal peripheral surface around the longitudinal axis, an alternating pattern of upper sealing blocks forming the sealing arrangement, and a plurality of lower centring blocks forming the centring arrangement.

13. A method of positioning a mandrel according to claim 1 in a liquid circulation pipe, said method comprising:
inserting the mandrel into the pipe, and lowering the mandrel in the pipe, the centring arrangement and the closure arrangement being in the contracted configurations thereof, the anchoring element being in the retracted state thereof; then
when the mandrel reaches a desired position in the pipe, radially deploying the centring arrangement to the at least partly dilated configuration thereof, and radially deploying the anchoring arrangement to the deployed state thereof, to apply at least in part the anchoring element and the centring arrangement against an inner wall of the pipe and to hold the body at a distance from the inner wall, the least one axial passage and the at least one axial pipe remaining unobstructed at least in part to allow a liquid to pass through the at least one axial passage and through the at least one axial pipe; followed by
displacing the closure arrangement to the dilated configuration thereof to close the at least one axial passage and to define a peripheral surface for applying the annular sealing arrangement against the pipe and a peripheral surface for applying the annular sealing arrangement against the body, the surfaces being continuous over at least a periphery about the longitudinal axis, and the anchoring element remaining in the deployed state thereof when the closure arrangement is radially deployed; and enabling the continuous sequential deployment of the centring arrangement, the anchoring element, and then the closure arrangement.

\* \* \* \* \*